(12) United States Patent
Tyrer (10) Patent No.: US 7,364,216 B2
(45) Date of Patent: Apr. 29, 2008

(54) GOLF CART FOLDABLE CANOPY

(76) Inventor: Stephen Edward Tyrer, 147 Taft Crescent, Centerport, NY (US) 11721

( * ) Notice: Subject to any disclaimer, the term of this patent is extended or adjusted under 35 U.S.C. 154(b) by 0 days.

(21) Appl. No.: 11/348,179

(22) Filed: Feb. 6, 2006

(65) Prior Publication Data

US 2006/0125279 A1     Jun. 15, 2006

Related U.S. Application Data

(63) Continuation of application No. 10/863,797, filed on Jun. 8, 2004, now Pat. No. 7,175,223.

(51) Int. Cl.
*B60P 7/02* (2006.01)
(52) U.S. Cl. .............................. 296/100.14; 280/DIG. 5
(58) Field of Classification Search ............ 296/100.14, 296/136.01, 136.12; 280/DIG. 5; 135/88.01, 135/88.09; 150/159, 166; 160/370.22
See application file for complete search history.

(56) References Cited

U.S. PATENT DOCUMENTS

| | | | |
|---|---|---|---|
| 4,734,952 A | 4/1988 | Parchment et al. | |
| 4,830,037 A * | 5/1989 | Held | 135/88.09 |
| 5,094,500 A | 3/1992 | Maypole et al. | |
| 5,155,883 A | 10/1992 | Legault | |
| 5,620,125 A | 4/1997 | Duncan et al. | |
| 6,126,050 A | 10/2000 | Aliano, Jr. | |
| 6,220,647 B1 | 4/2001 | Winkler | |
| 6,422,641 B1 | 7/2002 | Coryell | |
| 6,425,562 B1 | 7/2002 | Knudson | |
| D463,226 S | 9/2002 | Winkler | |
| 6,471,281 B1 | 10/2002 | Tyrer et al. | |
| 6,601,745 B2 | 8/2003 | Tyrer | |
| 2002/0027373 A1 | 3/2002 | Winkler | |
| 2002/0033402 A1 | 3/2002 | Winkler | |
| 2002/0037779 A1 | 3/2002 | Meyer et al. | |
| 2002/0056728 A1 | 5/2002 | Winkler | |
| 2002/0145302 A1 | 10/2002 | Winkler | |

\* cited by examiner

*Primary Examiner*—Joseph D. Pape
(74) *Attorney, Agent, or Firm*—Hoffmann & Baron, LLP (57) ABSTRACT

A rearwardly extending canopy cover for protecting golf bags and golf clubs from rainfall in the rear of golf carts. The canopy cover being adapted to pivotally attach to the golf cart side walls located behind the seat back of the cart. The canopy may be folded to a retracted position allowing access to the golf clubs and extended, providing protection for the golf bag and clubs from rainfall.

24 Claims, 10 Drawing Sheets

GOLF CART FOLDABLE CANOPY

CROSS-REFERENCE TO RELATED APPLICATIONS

This application is a continuation of U.S. application Ser. No. 10/863,797, filed on Jun. 8, 2004 now U.S. Pat. No. 7,175,223, which is incorporated herein by reference.

FIELD OF THE INVENTION

This invention relates generally to the field of retractable golf cart canopies for protecting stored golf bags and clubs in the rear of the golf cart from rain.

DESCRIPTION OF THE RELATED ART

Canopy covers in the past have been utilized to protect golf bags and clubs located in the rear bag storage compartment of golf carts from rain and damp weather conditions. It is well known in the sport that wet golf club grips can hinder the performance of the player and is undesirable.

Generally, retractable canopy covers attach to the back of the cart's top and to the frame members behind the seat back of the cart. The connection to the top is typically made with an extruded channel member that accepts the top edge of the canopy, although, other methods have been employed. The connection to the cart's frame is typically made using a structural support member that serves as a mounting base bracket for a foldable frame structure supporting the canopy. The foldable frame structure is generally made up from a plurality of U-shaped support struts and is pivotally connected to the base bracket. The base bracket generally attaches directly to the frame members of the cart, behind the seat back.

Connecting the base bracket of the canopy cover to the frame members of the golf cart is often a troublesome task that leads to less than ideal results. The frame members are generally narrower in width than the desired width of the canopy cover, forcing the base bracket to be wider than the frame members. Therefore, the base bracket hangs over the frame members and gets in the way of other accessories that can be mounted to the golf cart. For example, golf cart owners often desire to mount sand and seed bottles, beverage coolers and golf shoe cleat cleaners on the sides of the golf cart. The wide base bracket can hinder the access to these accessories. Even if the base bracket is not wider than the frame members it can still interfere with access to the sweater storage bin on the golf cart located behind the seating compartment. In addition, the base bracket or brackets used as the mounting supports for the foldable frame structures add cost to the canopy cover and require additional assembly steps.

At least one other approach has been made to eliminate the base bracket that connects to the frame members of the cart behind the seat back. Instead, brackets are attached to the rear frame members supporting the top of the golf cart that extend to secure to the foldable frame structure supporting the canopy. Generally, the brackets attach to the first U-shaped strut in the canopy support frame. This design eliminates the need for a base bracket to be mounted onto the frame members behind the seat back of the cart, but it does not provide a rigid and stable mounting system for the foldable frame structure supporting the canopy. Since the rear frame members supporting the top of the cart are positioned a significant distance from the rear edge of the cart's top, the brackets have to be relatively long, making them weak and unstable. The canopy including the supporting foldable frame structure, is relatively heavy and when the cart is moving the canopy assembly of this design tends to sway back and forth. In addition, the canopy cover of this design is not robust and can be easily bent from side to side. Therefore, this canopy cover is likely to be damaged by tree branches or a player leaning against it.

Therefore, a rearwardly extending canopy cover that is robust and sturdy that does not require an additional base bracket connected to the frame members behind the seat back of the cart to support the foldable canopy frame structure is desired.

BRIEF SUMMARY OF THE INVENTION

The present invention provides a rearwardly extending canopy cover for golf carts that is stable and does not require the addition of a base bracket or member that must be attached to the frame members behind the seating area of the golf cart. Instead, the present invention enables the foldable frame structure supporting the canopy to be pivotally connected to the side walls or sweater storage bin of the golf cart behind the cart's seat back.

In the first aspect of the present invention, a front strut attaches to the golf cart's frame supporting the top of the cart or, alternatively, to the side walls of the golf cart to provide structural support for the top edge of the canopy. The foldable frame structure for supporting the canopy is pivotally attached to the side walls of the golf cart.

In the second aspect of the present invention, the front top edge of the canopy is directly mounted to the rear portion of the top of the golf cart, eliminating the need for the front strut. Again, the ends of the U-shaped frame members are pivotally attached to the side walls of the golf cart.

In the third aspect of the present invention, the canopy support frame structure is pivotally mounted onto the sides of the sweater storage bin.

In the forth aspect of the present invention, the canopy support frame structure is pivotally mounted onto the top of the side walls behind the seat back of the golf cart.

Therefore, the present invention provides a rearwardly extending canopy cover for a golf cart that is simple to install and use. In addition, it does not require a support bracket to be mounted to the rear frame members of the cart to provide the pivotal attachment of the foldable frame structure supporting the canopy. Instead, it enables the foldable frame structure supporting the canopy to be pivotally connected to the side walls or sweater storage bin of the golf cart behind the cart's seat back.

Other advantages and features of the present invention will become apparent when viewed in light of the subsequent description of the preferred embodiments and the appended claims, taken in conjunction with the accompanying drawings.

DETAILED DESCRIPTION OF THE PREFERRED EMBODIMENT(S)

Figure 1:
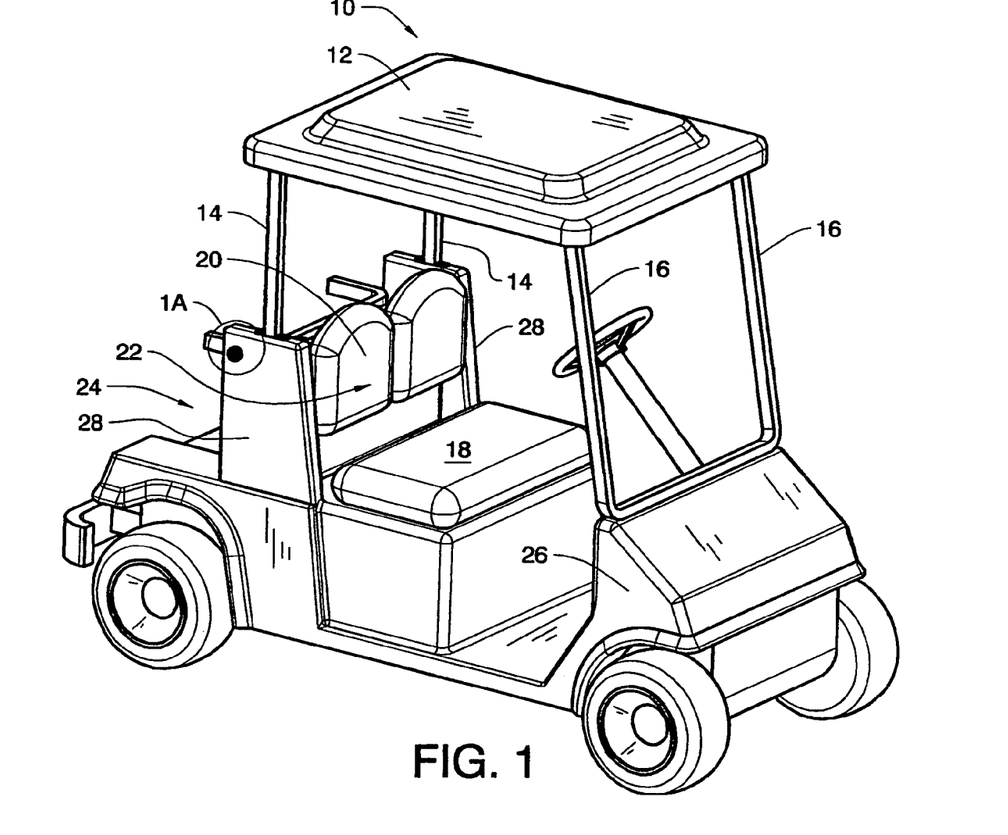
FIG. 1 is a front perspective view of a golf cart in which an embodiment of the present invention may be used.
Figure 1A:
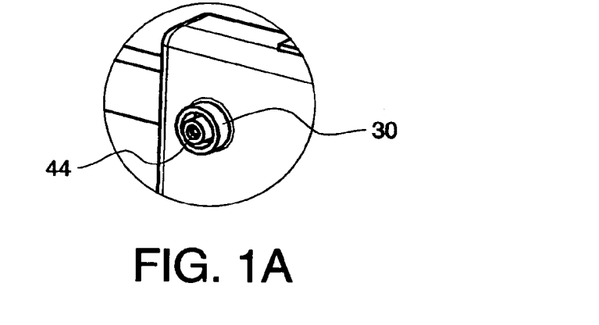
Figures 2, 2A:
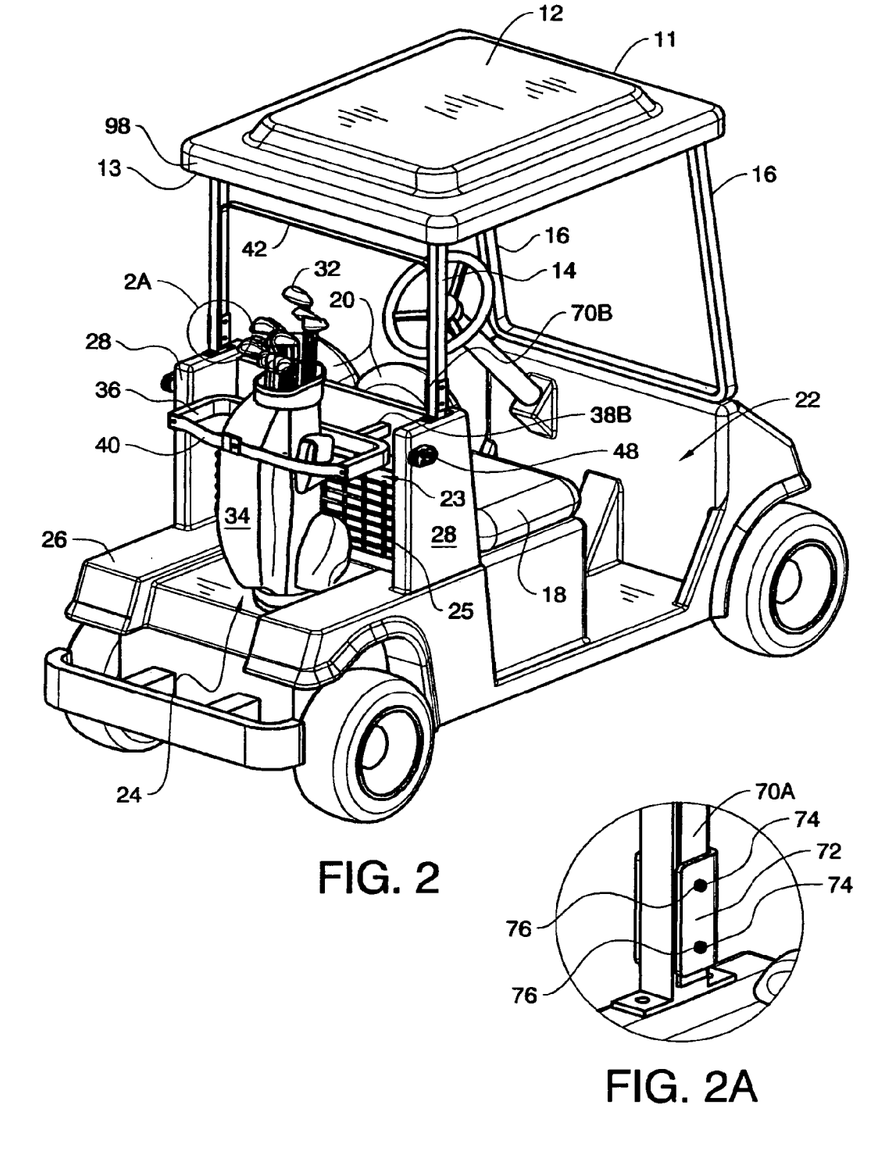
FIG. 2 is a rear perspective view of the golf cart with a front strut for supporting the top edge of the canopy secured to the cart's frame.
FIG. 2A is an enlarged partial view of an attachment mechanism used to mount the front strut member to the golf cart's frame that supports the top of the cart.
Figure 4:
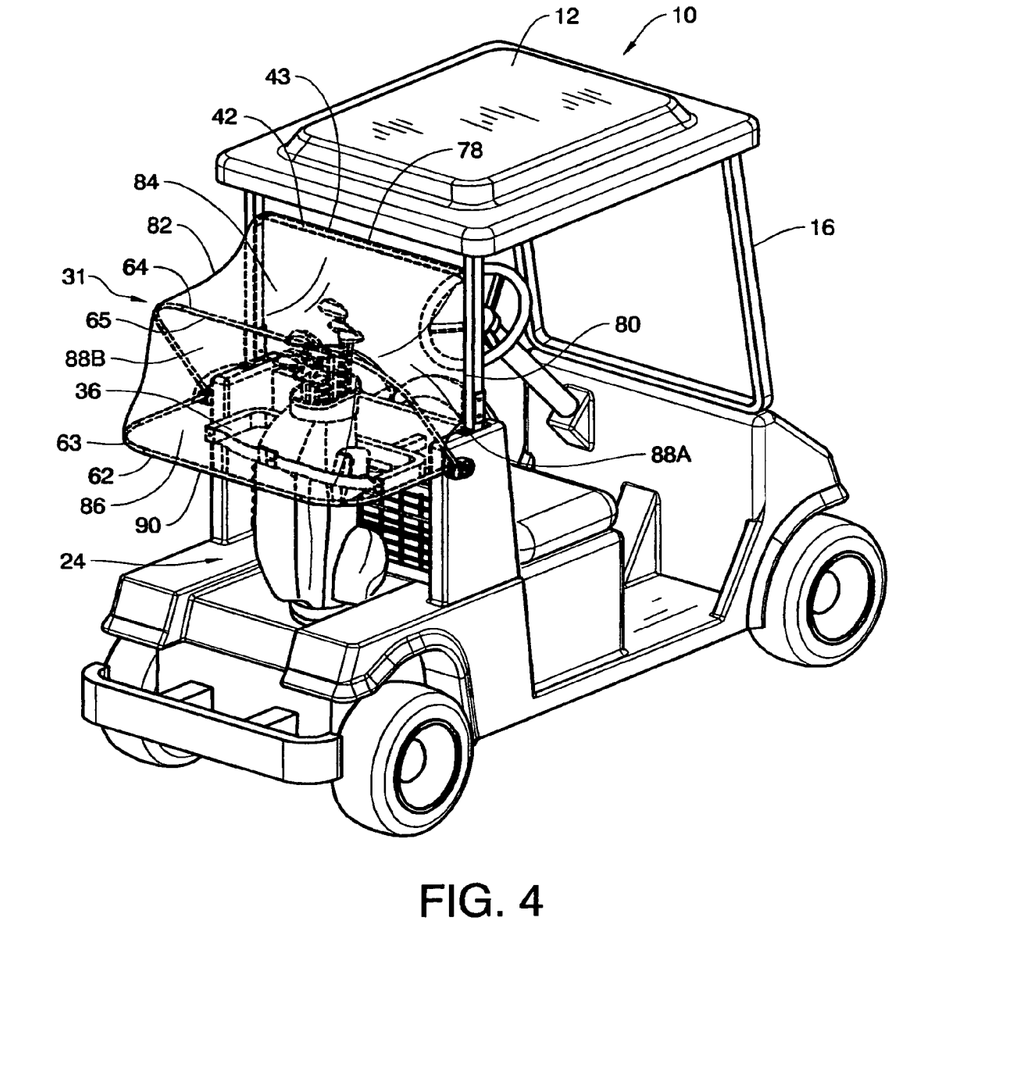
FIG. 4 is a rear perspective view of the golf cart with the first preferred embodiment of the present invention, a canopy cover, attached to the golf cart using the forward strut.

FIG. 1 shows a perspective view of a motorized golf cart 10 to which an embodiment of the present invention, generally indicated as a rearwardly extending canopy cover 31 in FIG. 4, can be attached. Cart 10 has a top 12 that is attached to the upper ends of rear frame members 14 and the upper portion of front frame members 16 using fasteners (not shown). Top 12 is used to protect passengers sitting in a passenger compartment 22 from rain. The passengers sit on a seat 18 with their back resting on a seat back 20. As can be seen in FIG. 2, behind seat back 20 is a sweater storage bin 23 and behind the sweater storage bin is a golf bag storage area 24 formed into a body 26 of cart 10. Cart 10 has side walls 28 that are adjacent sweater storage bin 23 on both sides of the cart behind seat back 20. The sweater storage bin includes a wire frame face 25 and side walls 28. The side walls can be made from a variety of processes and materials, as for example, molded plastic or stamped metal. The wire frame face can be made from metal wire or molded plastic. Side walls 28 may be formed as part of the body of the golf cart or may be separate from the main body of the cart. The side walls can also be made up of a combination of formed walls and support frame of the cart.

As shown in FIG. 1, circular bosses 30 extend from side walls 28 on both sides of the cart adjacent to the sweater storage bin. The bosses provide pivotal mounting features for canopy cover 31. The exact location of bosses 30 can vary, depending on the desired amount of the canopy cover coverage and the individual design of the cart. However, in general the bosses may be located adjacent to the sweater storage bin on the outside of the side walls of the cart. Generally, the bosses will be located on the wall at an elevation approximately equal to the height of the top of the sweater storage bin, however, other heights would work as well and the bosses may be located on the inside surface of the side walls. Bosses 30 may be integrally formed as part of the side walls of the cart or they may be attached to the side walls of the cart. Those skilled in the art will understand that the term "bosses" as used herein are structures which provide a surface to which frame members or other devices may be pivotally mounted to allow the canopy cover to be extended or retracted as discussed in detail below.

Figure 3A:
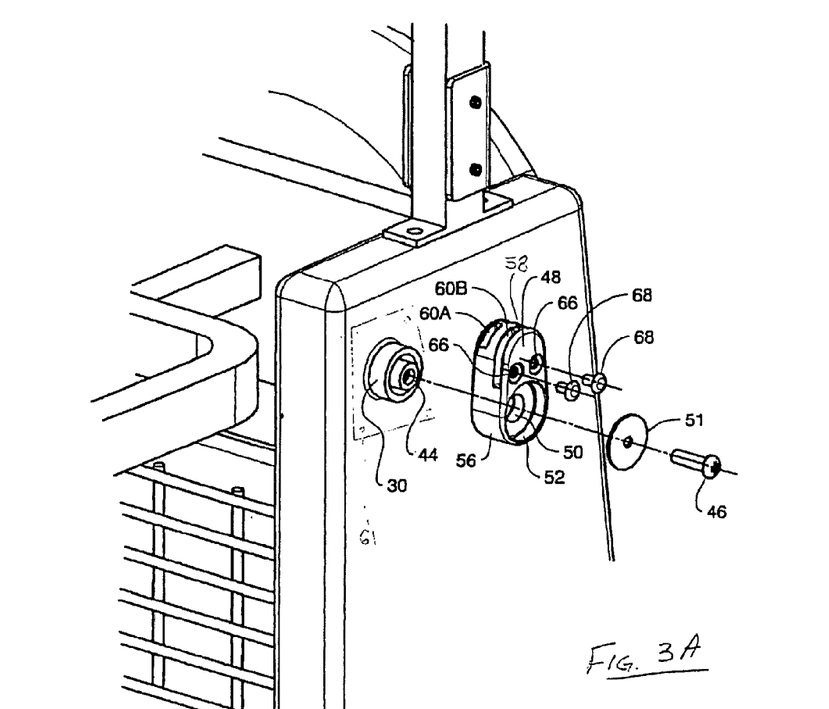
FIG. 3A is an enlarged partial view showing a portion of the side wall of the cart having the mounting boss for pivotally connecting the frame structure of the canopy cover.
Figure 3B:
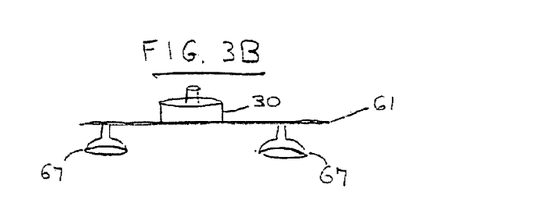
FIG. 3B is a side-view of a plate-mounted boss with suction-type mounting devices.

Side walls 28 and bosses 30 may be constructed using a molded polymer material or stamped metal. Preferably, the bosses may be formed integrally with the manufacture of side walls. Alternatively, the bosses may be mounted with a bore provided in the side walls and press fit therein or include a flange having mounting holes to receive mounting screws. Bosses 30 could also be formed to be surface mounted by making the bosses on a flat plate 61, as shown in FIG. 3A, which could be fixedly attached to the side walls 28 of the golf cart. Other methods of attachment such as adhesives, suction-type mounting devices 67, as shown in FIG. 3B, and other fastening systems know in art are contemplated and fall within the scope of the present invention. Furthermore, bosses 30 could be replaced with mounting holes in the side walls of the cart or extending pins to allow pivotal attachment of the canopy cover.

The bag storage area, shown in FIG. 2, is equipped with a golf bag support bracket 36 that is attached to rearwardly extending frame members 38A and 38B. Bag support bracket 36 is generally equipped with straps 40 that surround the golf bag or bags to secure them to the bag support bracket. Therefore, the straps and the bag support bracket cooperate to secure a golf bag 34 to golf cart 10. The details of this securing method are well known in the art and will not be further described.

Top 12, shown in FIG. 2, has a front end 11 and a rear end 13 and is located above passenger compartment 22. The top does not cover the bag storage area to allow the player to remove golf clubs 32 from golf bag 34 without hitting the golf clubs on the underside of top 12 while trying to lift the golf clubs out of the golf bag. Therefore, the bag storage area and the golf bag are exposed to rainfall. In order to protect bag storage area 24, it is desirable to have a cover that extends over the bag storage area. It is also necessary that the cover can be retracted or folded out of the way so that the player may remove the golf clubs without being hindered by the covering directly above golf bag 34.

FIGS. 2 and 2A show the components used to mount a first preferred embodiment of the foldable canopy cover 31, shown in FIG. 4, to cart 10. They include circular bosses 30 located on side walls 28 and a front strut 42 secured to rear frame members 14 that support the top of the cart. As shown in FIG 3A, in the center of each circular boss 30 is a screw bore 44 that has a diameter slightly smaller than the threads on a self-tapping screw 46. A pivot arm 48 has a pivot hole 50 that is used to pass screw 46 through to assemble the pivot arm onto boss 30. This may be accomplished by assembling a counter bore 52 over circular boss 30 and assembling a round washer 51 on screw 46 and self-tapping the screw into screw bore 44. In this way, pivot arm 48 is pivotally attached to side walls 28. The pivot arm can be made from a variety of molded plastics, although metal would also work.

There are numerous other mounting features that could be used to pivotally connect pivot arms 48 to side walls 28. The above-described mounting feature and method offers a simple pivotal attachment joint for illustrative purposes, however, the screw could be replaced with a pin, rivet, bearing member or other type of fastener which allows for pivotal movement. In addition, the circular bosses could also be eliminated and the pivot arm could rotate around the fastener, pin or other pivot member. Still further, pivot arms 48 could be eliminated with the canopy cover frame or struts being directly pivotally attached to side walls 28 using fasteners, pins or other pivot members on the side walls of the golf cart preferably behind the seat back.

With reference to FIGS. 3A and 4, pivot arm 48 is a molded part with a mount end 56 that transitions into a receiving end 58. The receiving end has slots 60A and 60B that are sized to receive the ends of a strut 62 and a mid-strut 64 shown in FIG. 4. When the strut and mid-strut ends are fully inserted into slots 60A and 60B, clearance holes 66 in pivot arm 48 align with rivet holes (not shown) in the strut and mid-strut ends to allow strut 62 and mid-strut 64 to be secured in slots 60A and 60B by securing rivets 68 in the aligned holes.

It should be understood that there are a number of other ways to form a pivotal attachment between strut 62, mid-strut 64 and the golf cart side walls 28. Pivot arms 48 could be replaced with other attachment members made from a metal or other materials. In addition, the pivot arms could be eliminated and the strut and mid-strut could be pivotally attached directly to cart side walls 28 using other fastening means known to those skilled in the art including, but not limited to, fasteners, pins or snapping features.

Front strut 42, shown in FIG. 2, is secured to an intermediate portion of rear frame members 14 that support top 12 of the golf cart. Front strut 42 is a generally U-shaped structural member having two opposing end portions 70A and 70B. As shown in FIG. 2A, end portions 70A and 70B are attached to rear frame members 14 using U-channels 72 that are sized to fit over rear frame members 14 with front strut 42 laying against the frame members, as shown. Set screws 74 thread through threaded bores 76 in U-channel 72 and pass through clearance holes in the front strut 42 (not shown). The set screws bottom against rear frame members 14. In this way, the front strut is secured to an intermediate portion of the rear frame members supporting the top of the cart. The front strut provides structural support for a top edge 78 and front edges 80 of a canopy 82, shown in FIG. 4. Front strut 42 can be made from metal, such as tubing or flat metal stock, however, strong plastic would also work. U-channel 72 can be made from stamped or formed metal channels or may be molded from high strength plastic. Set screws 74 can be made from metal or other high strength materials. The set screws are tightened by the installer when front strut 42 is in the desired location. When the bottom of the set screw contacts the surface of the frame members that support the cart top, U-channels 72 tighten against the frame members, holding the front strut in position.

There are numerous variations that could be made to front strut 42 and U-channel 72 without departing from the scope of the present invention. For example, the front strut could be made into a rectangular member having four sides. This member could be connected together to form a nearly continuous or entirely continuous rectangular loop. Front strut 42 could also be made from a number of sections secured together. Therefore, the illustrated and described front strut 42 could be replaced by another type of front strut that also provided structural support for at least upper top edge 78 of canopy 82, shown in FIG. 4. U-channel 72 and set screws 74 could be replaced by U-bolt assemblies or other types of clamping mechanisms. In addition, the U-channels and the set screws could be eliminated by directly mounting front strut 42 to rear frame members 14. This could be accomplished by using fasteners such as rivets, bolts, self-tapping screws, magnets, clamps or other types of fasteners to secure end portions 70A and 70B to rear frame members 14. The front strut could also be mounted to other portions the frame members located behind seat back 20 on the golf cart.

Turning now to a detailed discussion of canopy 82, shown in FIG. 4. Canopy 82 is defined by a canopy top 84, a canopy back 86 and a first and second side 88A and 88B. The canopy has a bottom edge 90, top edge 78 and two vertical front edges 80 that define the limits of the canopy. The canopy serves as the rain shield portion of canopy cover 31. Canopy 82 is made from a thin sheet of flexible water-resistant or waterproof material, as for example vinyl, nylon, canvas or plastic that may be sewn together.

With reference again to FIG. 4, strut 62 and mid-strut 64 provide a foldable structural support for the canopy. Strut 62 is generally a U-shaped continuous support with opposite ends. The length of the strut corresponds to bag storage area 24 to ensure that the strut supports canopy 82 over the majority of the bag storage area when the canopy is in the extended position shown. The mid-strut is generally a U-shaped continuous support with opposing ends. The length of the mid-strut corresponds to the amount of clearance desired between the canopy and the golf clubs and the shape of the canopy that it supports. Both the strut and the mid-strut are preferably made of a semi-rigid material like metal or a high strength plastic, as for example molded nylon. Strut 62 passes through a sewn strut sleeve 63 and mid-strut 64 passes through a sewn mid-strut sleeve 65 in the canopy to locate and attach them in the desired position within canopy 82. In this way, the canopy is attached to strut 62 and mid-strut 64.

Figure 5:
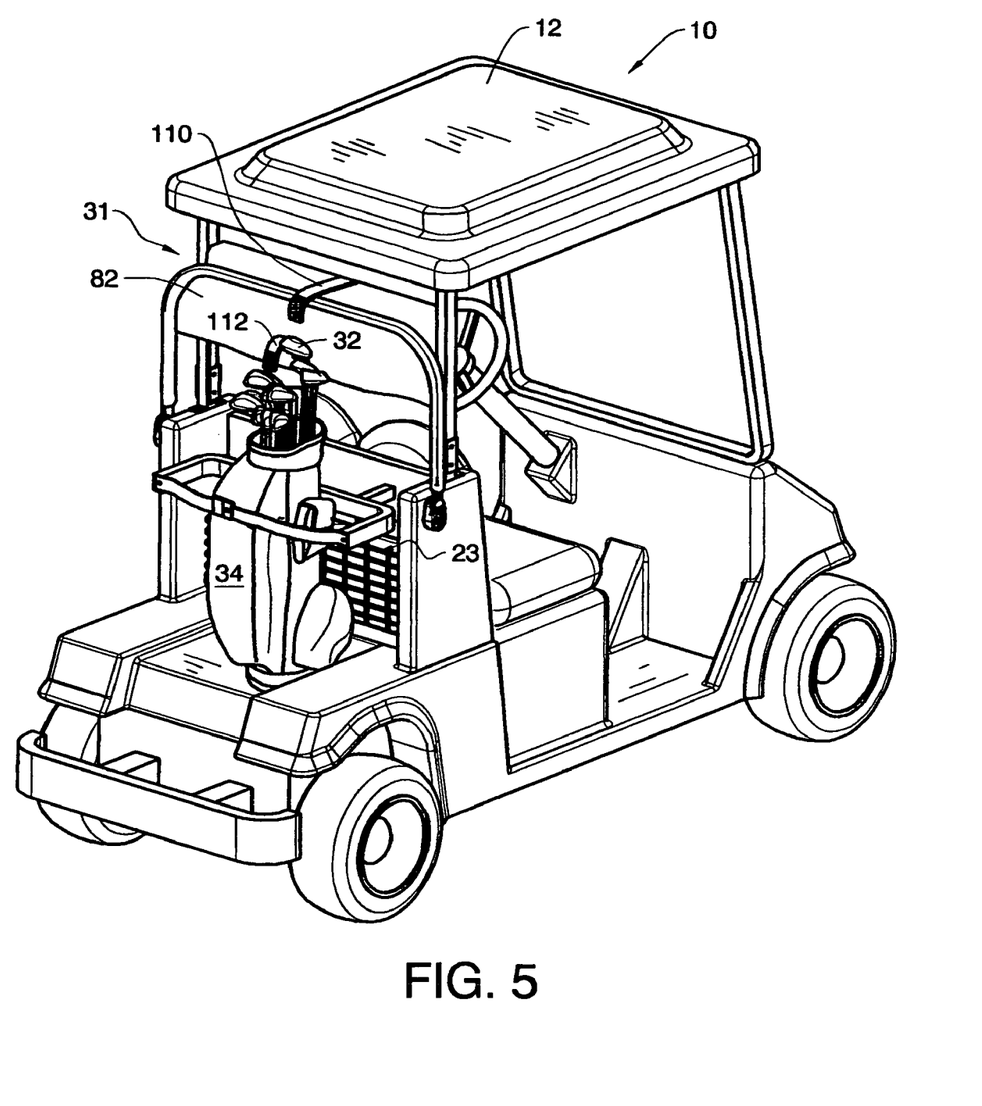
FIG. 5 is a rear perspective view of the golf cart with the first preferred embodiment of the present invention, shown in FIG. 4, folded up into a retracted position to allow access to the golf clubs.

As an alternative, the strut and mid-strut could be attached to the canopy using other fastening methods as for example hook and loop fasteners, snaps or other fastening means. Strut 62 and mid-strut 64 together makeup the pivotal frame structure for supporting canopy 82. The ends of strut 62 and mid-strut 64 are connected to pivot arm 48, as previously described. Pivot arms 48 are pivotally connected to golf cart side walls 28. In this way, the strut and mid-strut can be pivot relative to the side walls to allow canopy 82 to be folded up, as shown in FIG. 5. Strut 62, mid-strut 64 and front strut 42 cooperate to form the frame structure for canopy 82, giving the canopy shape and support.

Referring now to FIGS. 3A and 4, top edge 78 and front edges 80 of canopy 82 are supported by front strut 42. The front strut passes through a front strut sleeve 43 and is connected onto the golf cart using U-channel 72, shown in FIG. 2. In this way, top edge 78 of canopy 82 is secured to front strut 42 to provide structural support for the top edge. The front strut preferably positioned so that it is under cart top 12. In this way, top edge 78 of canopy 82 is located in front of rear end 13 of cart top 12 so that the cart top hangs over the top edge of the canopy, preventing rainfall from dripping down onto the bag storage area.

Other fastening methods could be used to secure front strut 42 to canopy 82 and the position of the front strut relative to rear end 13 could be changed without departing from the scope of the present invention. For example, front strut 42 could be attached to the canopy using hook and loop fastening strips, snaps, lies or other fastening means.

With reference again to FIG. 4, canopy cover 31 is attached to cart 10 and is extended to protect golf bag 34 and golf clubs 32 from adverse weather conditions like rainfall. In the extended position shown, canopy 82 is taunt from front strut 42, stretching over mid-strut 64 and down over strut 62. In this way, canopy 82 covers bag storage area 24 and remains in this position due to the weight of the canopy, strut 62 and mid-strut 64. It should be understood that it is not necessary for canopy 82 to extend over front strut 42, mid-strut 64 and strut 62, instead, the canopy could be attached to the edge of these struts.

With reference to FIG. 5, canopy cover 31 is attached to cart 10 and is shown in a folded up position to allow access to golf bag 34 and golf clubs 32. Canopy 82 is folded up from the extended position, shown in FIG. 4, by gripping the bottom of canopy 82 near strut 62 and lifting the strut upwardly, toward the back of top 12 on golf cart 10. The moment force created from this lifting action causes pivot arms 48 to rotate around circular bosses 30 mounted on golf cart side walls 28. At approximately the halfway point of folding up the canopy, mid-strut 64 begins to rotate upwardly toward the back of top 12. When the lifting action is complete, as shown in FIG. 5, both strut 62 and mid-strut 64 are substantially vertical. The user may secure canopy 82 in this position by fastening a hook strap 110 to a loop strap 112. Hook strap 110 is sewn or otherwise attached near the top edge 78 of canopy 82 and loop strap 112 is sewn or otherwise attached near bottom edge 90. In this way, the canopy is retained in the folded position shown by the hook and loop straps. Other types of retaining mechanisms may be used to retain the canopy in the folded position without departing from the scope of the present invention. For example, the hook and loop straps can be replaced with a spring mechanism urging the struts to stay folded, tie straps, straps with snaps, or other connecting means. The folded canopy may also be enclosed within a boot formed at the top end of the canopy as described in commonly owned U.S. Pat. No. D478,859.

The player may extend the canopy by separating hook strap 110 from loop strap 112 and pulling bottom edge 90 of canopy 82 near strut 62 downwardly and toward the back of the cart. This will extend the cover over bag storage area 24, as shown in FIG. 4, providing rain protection for the golf bag and golf clubs.

Figure 6:
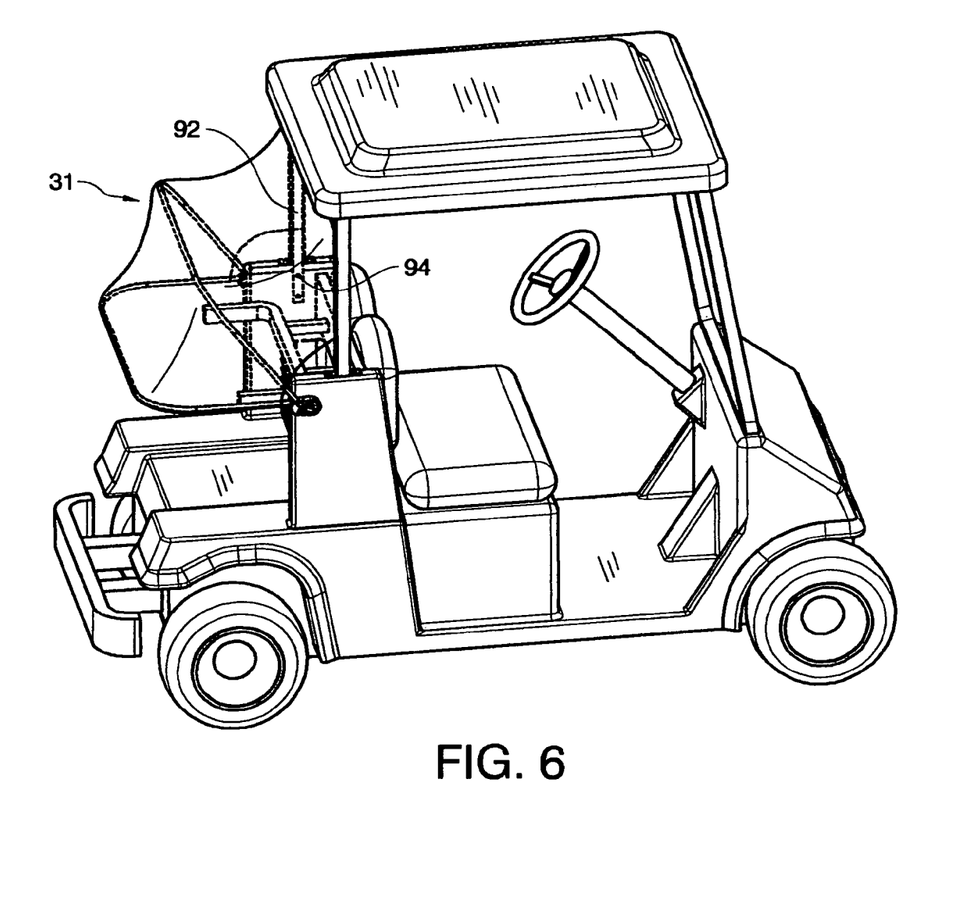
FIG. 6 is a perspective view of the golf cart showing an alternative way to mount the forward strut of the present invention.

As shown in FIG. 6, the front strut can be secured to the golf cart using a variety of methods. For example, FIG. 6 illustrates a modified front strut 92 has modified end portions 94 fastened to the inside surface of side walls 28 as shown. The modified front strut is secured directly to the side walls of the cart, eliminating the need for U-channels 72. Screws, rivets or other fasteners could be used to secure the modified end portions to the inside surface of side walls 28. As can be understood by one of ordinary skill in the art, there are a number of modifications that could be made to this front strut or modified front strut without departing from its scope. For example, side walls 28 could be modified to have receiving pockets for the ends of modified front strut 92. Also, the modified front struts could be connected to the outside surfaces of side walls 28, instead of the inside surface.

Figures 7, 7A:
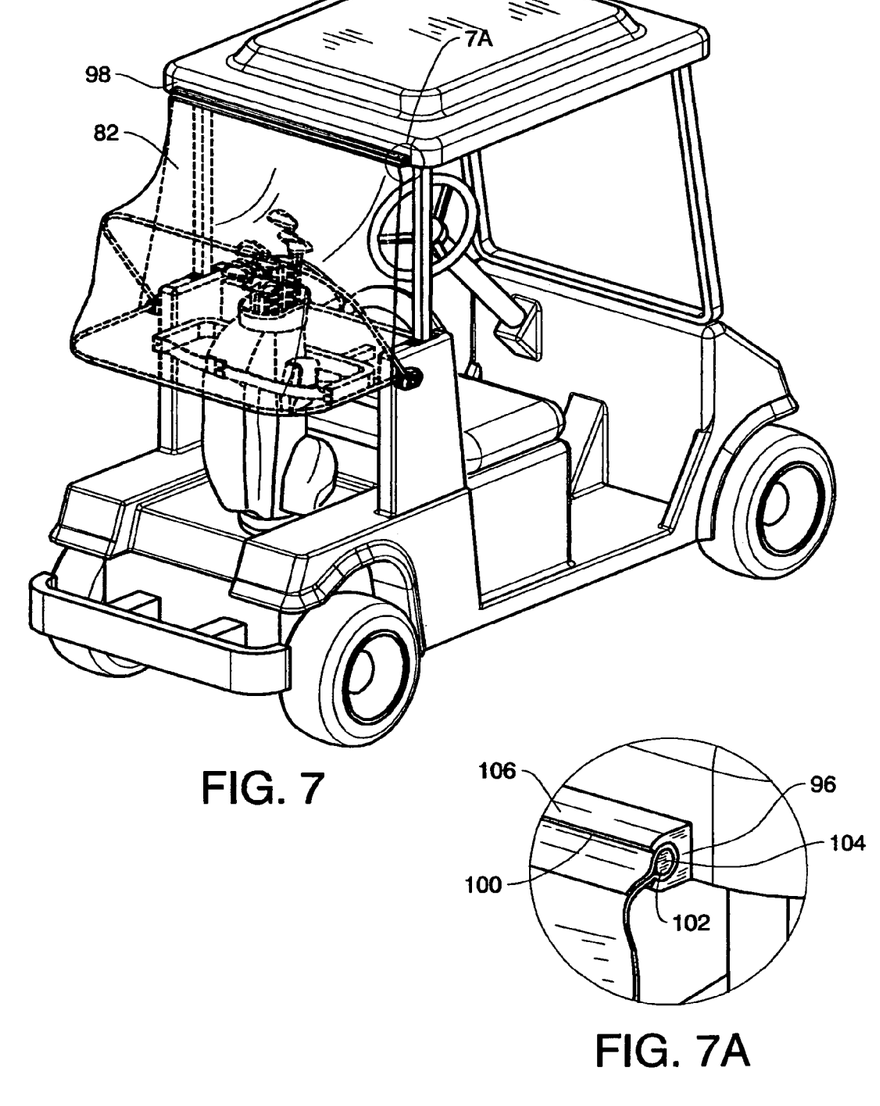
FIG. 7 is a rear perspective view of the golf cart with a second embodiment of the present invention showing the forward edge of the canopy cover mounted to the rear of the golf cart top.
FIG. 7A is an enlarged partial view of the connection method used to attach the front top edge of the canopy to the top of the cart top.

A second embodiment of the present invention is shown in FIGS. 7 and 7A. In this embodiment, the top front edge of the canopy is attached using a different connection method. A channel 96 is attached to a rear face 98 of top 12 using rivets (not shown). The channel is one continuous piece of extruded aluminum, however, extrude plastic will also work. The channel is elongated having a width about equal to the width of canopy. The channel has a substantially C-shaped cross section with a rearward opening 100 that extends across the entire width of the channel. The channel is used to secure the top portion of canopy 82 to cart 10. As an alternative, screws or other fastening means may be employed to secure channel 96 to rear face 98 and the channel may have a different cross section other than the C-shape described. It should be understood that the channel could be replaced by other fastening methods for securing the top portion of the canopy to the cart, as for example, hook and loop fasteners, snaps, zippers and other fastening means. The rest of this embodiment is the same as the first preferred embodiment of the present invention.

Turning now to a detailed discussion of canopy 82, shown in FIGS. 7 and 7A, the canopy has a rolled and a sewn top edge forming a rod sleeve 102 that a round rod 104 is slid endwise into until the ends of rod 104 corresponds to the ends of the rod sleeve forming a rounded top edge 106. Rod 104 has a length about the same as the length of channel 96. The rod sleeve and the rod are sized to allow them to be inserted as an assembly endwise into the C-shaped cross section of channel 96, as shown in FIGS. 7 and 7A. With the rod inserted, rounded top edge 106 has a diameter larger than opening 100 in channel 96 preventing the rounded top edge from passing through opening 100, securing the top edge within channel 96. Rod 104 may be constructed of a rigid material as for example plastic, metal or wood.

Figure 8:
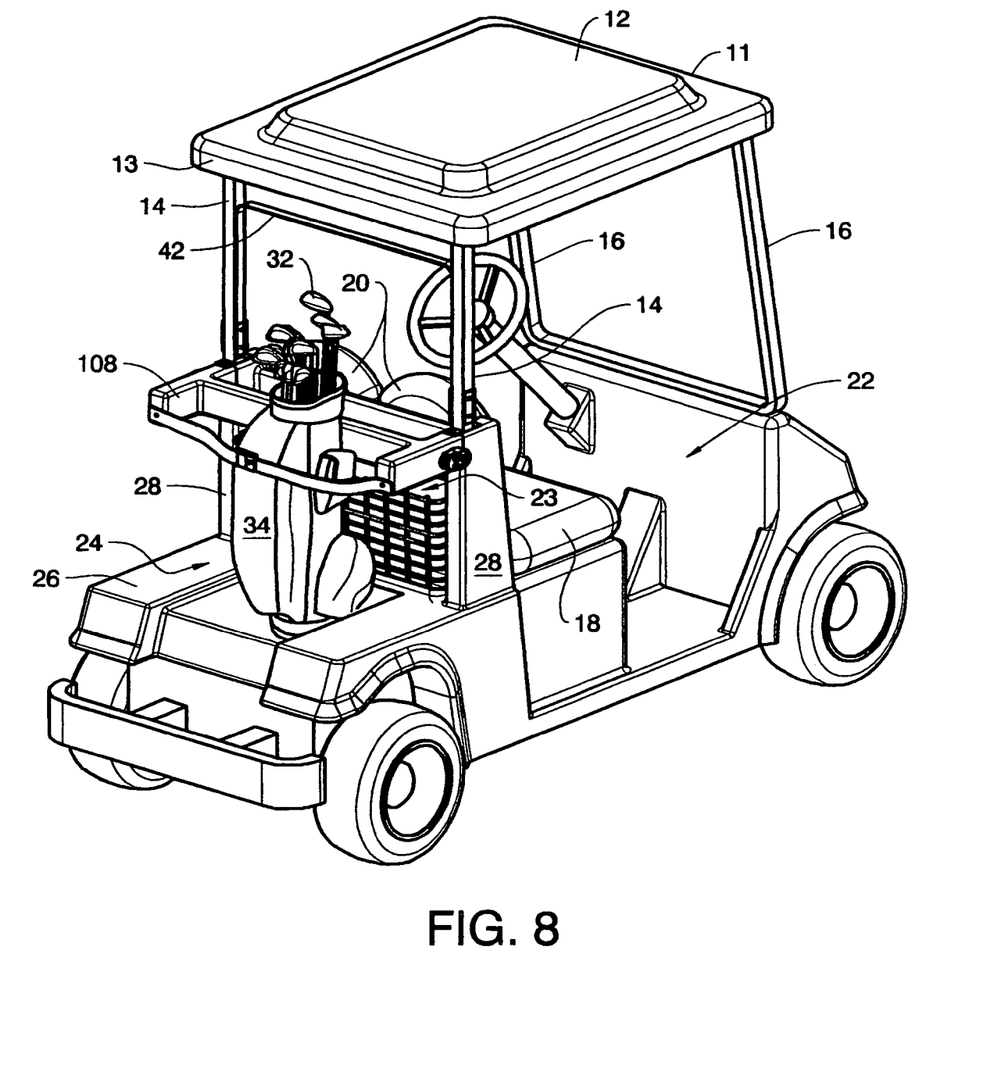
FIG. 8 is a rear perspective view of the golf cart with a third embodiment of the present invention with the mounting features attached to a different location.
Figure 9:
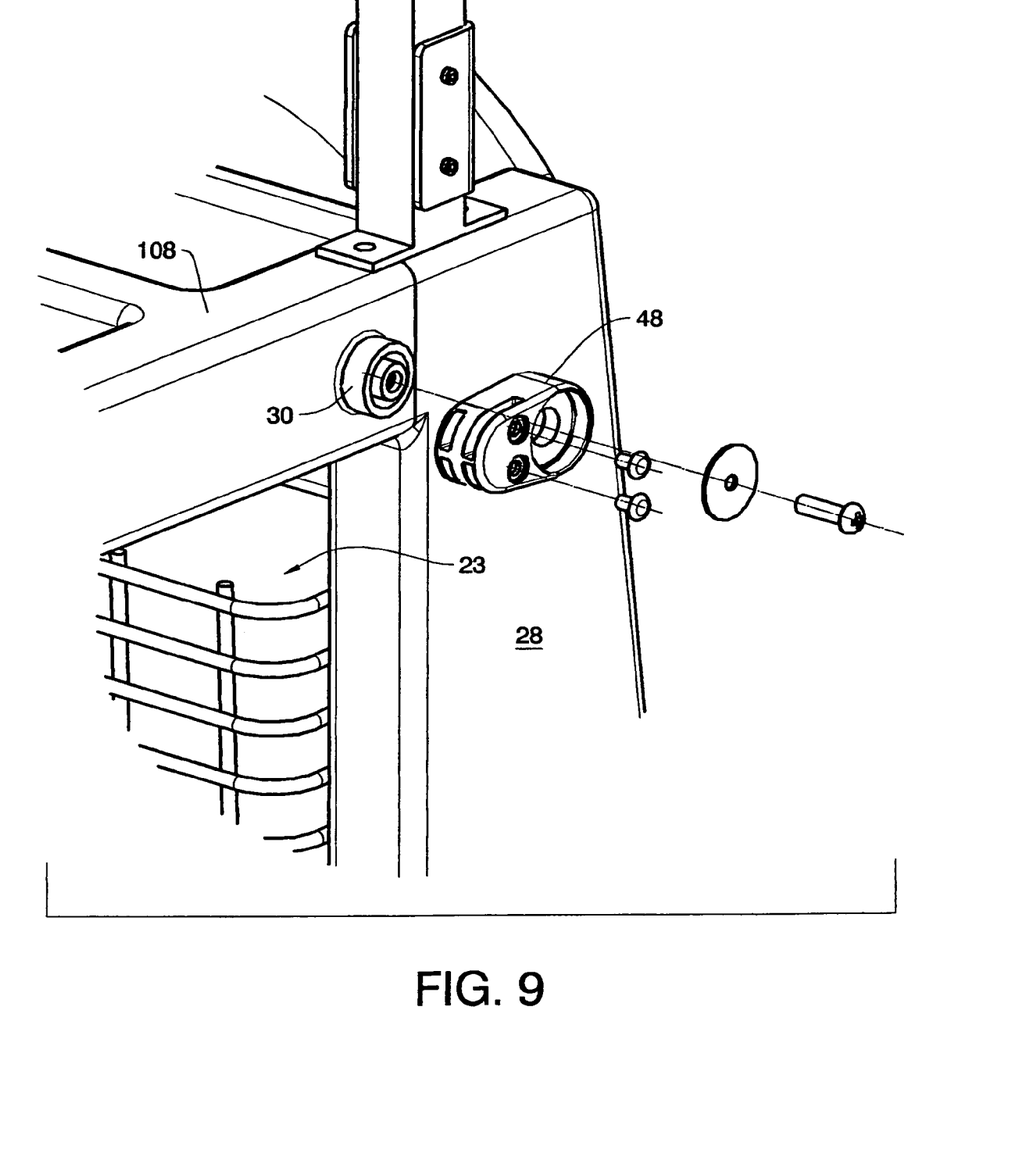
FIG. 9 is an enlarged partial view of the mounting features shown in FIG. 8.

A third embodiment of the present invention is shown in FIGS. 8 and 9. In this embodiment, bosses 30 have been attached to extension members 114 that extend from a modified bag support bracket 108. The extension members form part of the sides of sweater storage bin 23 and part of the side walls 28. The extension members can be made from molded plastic or formed metal. Bosses 30 may be integrated as a part of extension members 114 or attached separately. Alternatively, the circular bosses could also be eliminated and the pivot arm could rotate around fasteners or pins directly installed into the extension members. Still further, pivot arms 48 could be eliminated with the canopy cover being directly pivotally attached to extension members 114 using fasteners, pins or other fastening means.

Figures 10, 10A:
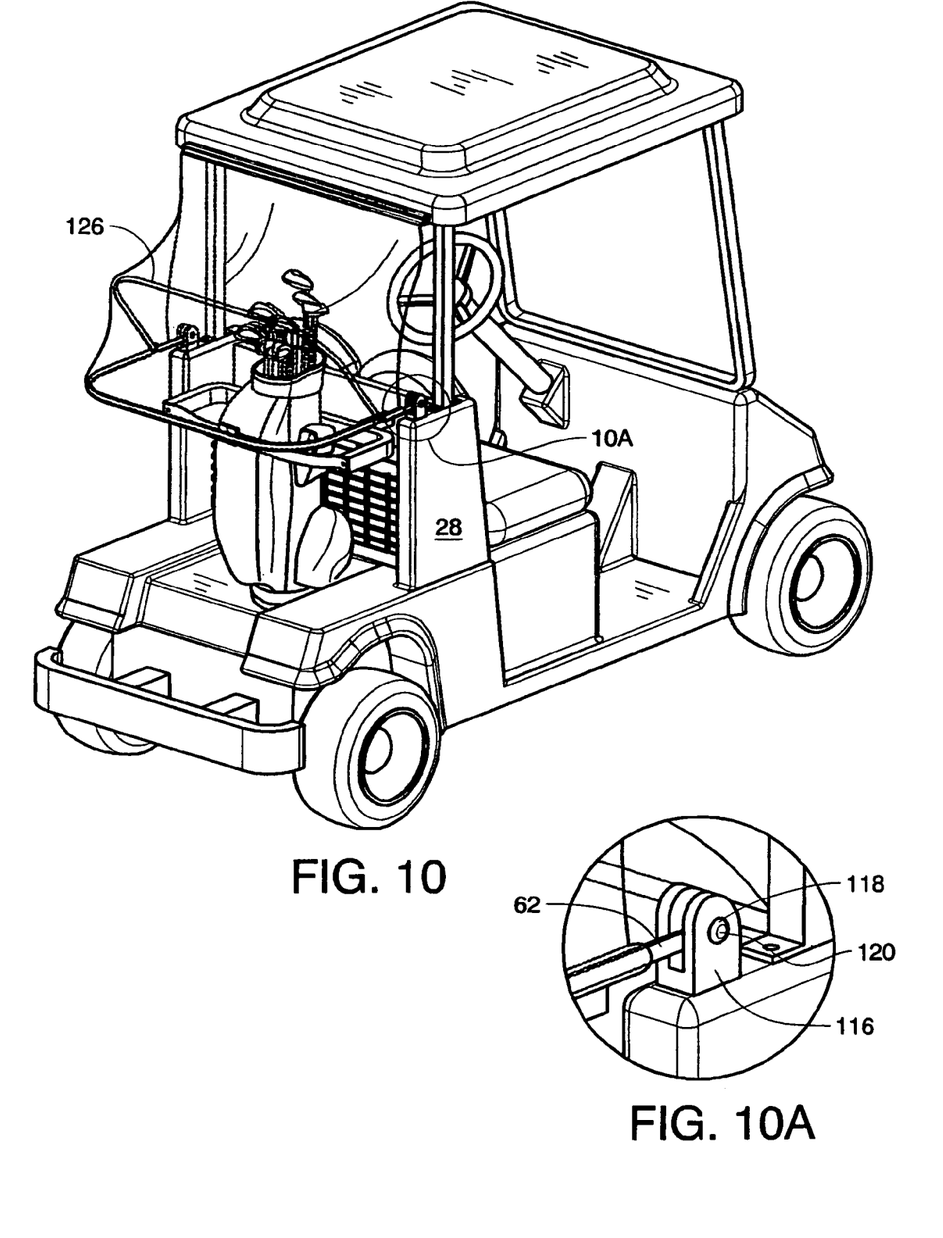
FIG. 10 is a rear perspective view of the golf cart with a fourth embodiment of the present invention with mounting features moved to a alternative location.
FIG. 10A is an enlarged partial view of the mounting features shown in FIG. 10.

A fourth embodiment of the present invention is shown in FIGS. 10 and 10A. The mounting features are located on the top of side walls 28. In addition, the pivot arms have been eliminated by directly pivotally connecting the ends of strut 62 to flanges 116. The flanges have pin holes 118 that are sized to accept pins 120, as shown in FIGS. 10 and 10A. Pins 120 pivotally attach the ends of strut 62 to flanges 116. On each end, the pin extends through pin hole 118 in flange 116 and continues through a pin bore (not shown), near the end of strut 62. Pin 120 is retained in this position by the use of a locking pin, e.g., a cotter pin, (not shown) or other securing method. In this way, strut 62 is pivotally attached to flanges 116. Alternatively, the pin and flange mounting features could be replaced with other types of mounting features providing a pivotal attachment between the strut and the top of side walls 28. For example, a raised boss could be attached to the top of each side wall that would enable pivotal attachment of the strut. This embodiment also illustrates another possible geometry of the strut configuration with a modified mid-strut 126 pivotally connecting to a midpoint of strut 62. Alternatively, the mid-strut could be connected to flanges 116 at the same point as strut 62.

While the invention has been described in connection with one or more embodiments, it is to be understood that the specific mechanisms and techniques which have been described or shown are for illustrative purposes only to provide a basic understanding of the invention, many modifications may be made to the invention described without deviating from the scope of the invention. Thus the scope of the invention should be determined by the appended claims and their legal equivalents, rather than by the examples given.

What is claimed is:

1. A canopy cover adapted to cover a golf cart, the golf cart comprising side walls located behind a seat back of the golf cart, the canopy cover comprising:
   a canopy;
   a frame adapted to support the canopy, the canopy being attached to the frame, the frame being foldable between an extended position and a retracted position; and
   mounting means for pivotally securing the frame to the side walls of the golf cart, the mounting means not being positioned on a supporting strut or supporting post, the side walls being formed as planar, non-strut, non-post sections of a body of the golf cart.

2. The canopy cover according to claim 1, wherein the at least one boss is positioned on at least one of the side walls by mounting the at least one boss to a plate.

3. The canopy cover according to claim 2, wherein the mounting means comprises at least two bosses each of which is attached to opposing side walls of the golf cart, the frame comprising arms pivotally coupled to the at least two bosses.

4. The canopy cover according to claim 2, wherein at least one of the bosses is attached to the at least one side wall using adhesive.

5. The canopy cover according to claim 2, wherein at least one of the bosses is attached to the at least one side wall using a suction-type mounting.

6. The canopy cover according to claim 2, wherein at least one of the bosses comprises a substantially flat plate.

7. The canopy cover according to claim 2, wherein at least one of the bosses comprises a molded polymer material.

8. The canopy cover according to claim 1, wherein the at least one boss is positioned on a side of at least one of the side walls.

9. In combination:
   a golf cart comprising a top supported by frame members and upstanding side walls located rearwardly of a passenger compartment seat back of the golf cart, the golf cart comprising a golf bag storage section; and
   a canopy cover adapted to cover the golf bag storage section of the golf cart, the canopy cover comprising:
   a canopy;
   a frame adapted to support the canopy, the canopy being attached to the frame, the frame being foldable between an extended position and a retracted position; and
   mounting means for pivotally securing the frame to the side walls of the golf cart, the mounting means not being positioned on a supporting strut or supporting post, the side walls being formed as planar, non-strut, non-post sections of a body of the golf cart.

10. The canopy cover according to claim 9, wherein the at least one boss is secured to at least one of the side walls by mounting the at least one boss to a plate.

11. The combination according to claim 10, the mounting means comprises at least two bosses each of which is attached to opposing side walls of the golf cart, the frame comprising arms pivotally coupled to the bosses.

12. The combination according to claim 10, wherein the mounting plate is attached to the at least one side wall using adhesive.

13. The combination according to claim 10, wherein at least one of the bosses is attached to the at least one side wall using a suction-type mounting.

14. The combination according to claim 10, wherein at least one of the bosses comprises a substantially flat plate.

15. The combination according to claim 10, wherein at least one of the bosses comprises a molded polymer material.

16. The canopy cover according to claim 9, wherein the at least one boss is secured to a side of at least one of the side walls.

17. A method of mounting a rearwardly extending canopy to a golf cart, the golf cart comprising side walls located behind a seat back of the golf cart, the canopy extending over a golf bag storage area, the method comprising:
   mounting a canopy on a frame, the frame being foldable between an extended position and a retracted position;
   securing a boss to at least one of the side walls of the golf cart, the at least one boss not positioned on a supporting strut or supporting post, the side walls being formed as planar, non-strut, non-post sections of a body of the golf cart; and
   mounting the frame pivotally to the boss.

18. The canopy cover according to claim 17, wherein the at least one boss is secured to at least one of the side walls by mounting the at least one boss to a plate.

19. The method according to claim 18, further comprising:
   securing at least two mounting plates comprising bosses to opposing side walls of the golf cart; and
   mounting the frame pivotally to the bosses.

20. The method according to claim 18, comprising securing the mounting plate to at least one of the side walls using adhesive.

21. The method according to claim 18, comprising securing the mounting plate to at least one of the side walls using a suction-type mounting.

22. The method according to claim 18, comprising forming the mounting plate using a substantially flat plate.

23. The method according to claim 18, comprising forming the boss using a molded polymer material.

24. The canopy cover according to claim 17, wherein the at least one boss is secured to a side of at least one of the side walls.

* * * * *